(12) United States Patent
Jo et al.

(10) Patent No.: US 11,975,470 B2
(45) Date of Patent: May 7, 2024

(54) HEAT-SEAL-LAMINATING PET FILM

(71) Applicants: Ig Lae Jo, Changwon-si (KR); Yong Je Kang, Busan (KR)

(72) Inventors: Ig Lae Jo, Changwon-si (KR); Yong Je Kang, Busan (KR)

( * ) Notice: Subject to any disclaimer, the term of this patent is extended or adjusted under 35 U.S.C. 154(b) by 382 days.

(21) Appl. No.: 17/574,403

(22) Filed: Jan. 12, 2022

(65) Prior Publication Data

US 2022/0242026 A1 Aug. 4, 2022

(30) Foreign Application Priority Data

Feb. 1, 2021 (KR) .......................... 10-2021-0013942

(51) Int. Cl.
| | | |
|---|---|---|
| *B29C 48/21* | (2019.01) | |
| *B29C 48/00* | (2019.01) | |
| *B29C 48/08* | (2019.01) | |
| *B29C 65/00* | (2006.01) | |
| *B32B 27/08* | (2006.01) | |
| *B32B 27/36* | (2006.01) | |
| *C08G 63/183* | (2006.01) | |

(Continued)

(52) U.S. Cl.
CPC ............ *B29C 48/21* (2019.02); *B29C 48/022* (2019.02); *B29C 48/08* (2019.02); *B29C 66/742* (2013.01); *B32B 27/08* (2013.01); *B32B 27/36* (2013.01); *C08G 63/183* (2013.01); *C08G 63/916* (2013.01); *C09J 7/255* (2018.01); *C09J 7/35* (2018.01); *B29K 2067/003* (2013.01); *B32B 2250/244* (2013.01); *B32B 2264/1021* (2020.08); *B32B 2270/00* (2013.01); *B32B 2307/31* (2013.01); *C09J 2301/304* (2020.08); *C09J 2467/00* (2013.01)

(58) Field of Classification Search
CPC ....... B29C 66/742; B32B 27/08; B32B 27/36; B32B 2250/244; B32B 2264/1021; B32B 2270/00; B32B 2307/31; B32B 2264/1022; C08G 63/183; C08G 63/916; C08G 63/189; C08G 63/199; C09J 7/255; C09J 7/35; C09J 2301/304; C09J 2467/00; C08L 67/02; C08L 2205/02; B29K 2067/003
See application file for complete search history.

(56) References Cited

U.S. PATENT DOCUMENTS

| | | | | |
|---|---|---|---|---|
| 6,139,954 A | * | 10/2000 | Dean .................. | D01F 6/46 525/445 |
| 6,268,026 B1 | * | 7/2001 | Jester ................. | C08J 5/18 264/513 |

(Continued)

FOREIGN PATENT DOCUMENTS

| | | | |
|---|---|---|---|
| KR | 10-2000-0030000 A | | 5/2000 |
| KR | 10-2001-0038200 A | | 5/2001 |

(Continued)

*Primary Examiner* — Scott R. Walshon
(74) *Attorney, Agent, or Firm* — Rabin & Berdo, P.C.

(57) ABSTRACT

Disclosed is a PET (polyethylene terephthalate) film capable of being laminated by heat sealing on a metal. The PET film is a coextruded PET film including an intermediate layer, and a surface layer and a heat seal layer bound to respective sides of the intermediate layer, the heat seal layer including 100 parts by weight of a PET resin modified simultaneously with 1,4-cyclohexane dimethanol, 1,3-propanediol, and 1,4-butanediol, and 10 to 50 parts by weight of a PET resin modified with isophthalic acid.

3 Claims, 2 Drawing Sheets

(51) Int. Cl.
*C08G 63/91* (2006.01)
*C09J 7/25* (2018.01)
*C09J 7/35* (2018.01)
*B29K 67/00* (2006.01)

(56) References Cited

U.S. PATENT DOCUMENTS

2013/0285277 A1* 10/2013 Behrendt ............ B65D 81/266
  264/141
2020/0079064 A1* 3/2020 Peiffer ................. C08G 63/183
2022/0234803 A1* 7/2022 Chaturvedi ................ C09J 7/22

FOREIGN PATENT DOCUMENTS

| KR | 10-2002-0011939 A | 2/2002 | |
| KR | 10-2012-0077904 A | 7/2012 | |
| WO | WO-9806575 A1 * | 2/1998 | ............ B32B 15/09 |
| WO | WO-2020240584 A1 * | 12/2020 | ............ B32B 15/09 |

* cited by examiner

HEAT-SEAL-LAMINATING PET FILM

BACKGROUND OF THE INVENTION

Field of the Invention

The present invention relates to a PET (polyethylene terephthalate) film, and more particularly to a heat-seal-laminating PET film capable of being easily laminated by heat sealing on the surface of a metal.

Description of the Related Art

For cases for home appliances, for example refrigerators, washing machines and the like or cases for various industrial devices, a film-laminated metal plate configured such that a PET film is laminated on the surface of a plate made of any of various types of steel, such as a galvanized or tin-coated steel plate, or on another kind of metal plate is used. The metal plate on which the PET film is laminated as described above is advantageous from the aspects of a good aesthetic appearance due to the PET film laminated on the metal plate, superior scratch resistance, and easy printability of various patterns and characters on the surface thereof.

Conventionally, an adhesive is applied onto the surface of a metal plate and a PET film is laminated on the surface of the metal plate using the applied adhesive. However, such conventional techniques are problematic in that the process of laminating the PET film is expensive, productivity is low, the defect rate in the process of laminating the PET film is high, and volatile organic compounds (VOCs) harmful to the human body are generated due to volatile organic solvents contained in the adhesive during the manufacture process.

[Citation List]
[Patent Literature]
Korean Patent Application Publication No. 10-2012-0077904 (Jul. 10, 2012)

SUMMARY OF THE INVENTION

The present invention has been made keeping in mind the problems encountered in the related art, and an object of the present invention is to provide a heat-seal-laminating PET film, which may be easily laminated by heat sealing on the surface of a metal without the need to use an adhesive.

The objects of the present invention are not limited to the foregoing, and other objects not mentioned herein will be clearly understood by those skilled in the art from the following description.

In order to accomplish the above object, the present invention provides a heat-seal-laminating PET (polyethylene terephthalate) film capable of being laminated by heat sealing on a metal, in which the PET film is a coextruded PET film including an intermediate layer, and a surface layer and a heat seal layer bound to respective sides of the intermediate layer, the heat seal layer including 100 parts by weight of a PET resin modified simultaneously with 1,4-cyclohexane dimethanol, 1,3-propanediol, and 1,4-butanediol, and 10 to 50 parts by weight of a PET resin modified with isophthalic acid.

The surface layer may include 100 parts by weight of a PET resin modified with 1,4-cyclohexane dimethanol, 1 to 5 parts by weight of a PET resin blended with 1 to 20 wt % of inorganic particles selected from the group consisting of silicon dioxide ($SiO_2$), titanium dioxide ($TiO_2$), calcium carbonate ($CaCO_3$), and mixtures thereof, and 2 to 10 parts by weight of a PET resin modified with isophthalic acid.

The intermediate layer may include 100 parts by weight of a PET resin modified with 1,3-propanediol, 50 to 100 parts by weight of a PET resin modified with 1,4-butanediol, and 5 to 15 parts by weight of a PET resin modified with naphthalic acid.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE INVENTION

Hereinafter, a detailed description will be given of embodiments of the present invention with reference to the accompanying drawings so that those of ordinary skill in the art to which the present invention pertains can easily implement the same. The present invention may be embodied in many different forms, and is not limited to the embodiments described herein.

Throughout the specification, when a part is said to "include" a certain component, it may mean that other components are further included, rather than necessarily excluding such other components, unless otherwise stated.

The present inventors have paid attention to the need for a PET film that may be laminated by heat sealing on a metal even without the use of an adhesive during the study of metal plates on which a PET (polyethylene terephthalate) film is laminated, used for cases for home appliances, etc., and thus ascertained that, when manufacturing a PET film having a three-layer structure through mixing of PET (polyethylene terephthalate) resins modified with various materials and coextrusion thereof, the manufactured PET film is easy to laminate by heat sealing on the surface of a metal and satisfies basic properties, thus culminating in the present invention.

The PET film according to the present invention is mainly very suitable for lamination by heat sealing on a metal plate, but the present invention is not limited thereto. The PET film according to the present invention may be utilized for lamination by heat sealing on metals having various shapes other than metal plates.

Hereinafter, the present invention will be described in detail.

Figure 1:
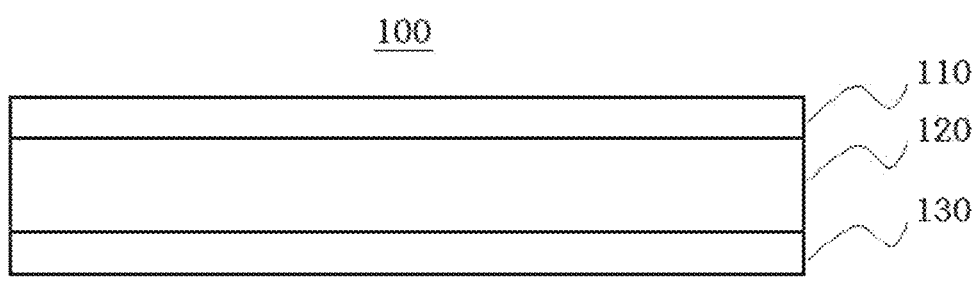
FIG. 1 is a cross-sectional view showing the structure of a PET film according to an embodiment of the present invention.

As shown in FIG. 1, the PET film 100 according to an embodiment of the present invention includes an intermediate layer 120, and a surface layer 110 and a heat seal layer 130 bound to respective sides of the intermediate layer 120, and is manufactured through a coextrusion process.

The surface layer 110 is provided for blocking and printing functions, the heat seal layer is provided for a function of heat-seal lamination to a metal, and the intermediate layer 120 is provided to bind the surface layer 110 and the heat seal layer and to perform a blocking function along with the surface layer 110.

The surface layer 110 includes 100 parts by weight of a PET resin modified with 1,4-cyclohexane dimethanol, 1 to 5 parts by weight of a PET resin blended with 1 to 20 wt % of inorganic particles selected from the group consisting of silicon dioxide ($SiO_2$), titanium dioxide ($TiO_2$), calcium carbonate ($CaCO_3$), and mixtures thereof, and 2 to 10 parts by weight of a PET resin modified with isophthalic acid.

The components and the component ratios of the surface layer 110 described above are optimal values obtained through extensive experimentation in the process of completing the present invention. When the components and the component ratios of the surface layer 110 are as specified above, the surface layer 110 may be firmly bound to the intermediate layer 120 to be described later, and blocking and printing functions may be imparted thereto.

The intermediate layer 120 includes 100 parts by weight of a PET resin modified with 1,3-propanediol, 50 to 100 parts by weight of a PET resin modified with 1,4-butanediol, and 5 to 15 parts by weight of a PET resin modified with naphthalic acid.

The components and the component ratios of the intermediate layer 120 described above are optimal values obtained through extensive experimentation in the process of completing the present invention. When the components and the component ratios of the intermediate layer 120 are as specified above, the intermediate layer 120 may serve to firmly bind the surface layer 110 and the heat seal layer 130 while performing a blocking function along with the surface layer 110.

The heat seal layer 130 includes 100 parts by weight of a PET (polyethylene terephthalate) resin modified simultaneously with 1,4-cyclohexane dimethanol, 1,3-propanediol, and 1,4-butanediol, and 10 to 50 parts by weight of a PET resin modified with isophthalic acid.

The components and the component ratios of the heat seal layer 130 described above are optimal values obtained through extensive experimentation in the process of completing the present invention. When the components and the component ratios of the heat seal layer 130 are as specified above, the heat seal layer 130 may be securely bound to the surface of the metal by heat while being firmly bound to the intermediate layer 120.

Moreover, respective resins for the surface layer, the intermediate layer, and the heat seal layer constituting the PET film according to the present invention may further include various additives typically used in the manufacture of a PET film, which will be obvious to those skilled in the art, and thus a detailed description thereof is omitted.

A better understanding of the present invention may be obtained through the following examples and test examples.

EXAMPLE

Manufacture of Heat-Seal-Laminating PET Film

A stretched coextruded PET film having a three-layer structure including a surface layer, an intermediate layer, and a heat seal layer was manufactured.

The resin for the surface layer was composed of a PET resin modified with 1,4-cyclohexane dimethanol, a PET resin blended with 10 wt % of silicon dioxide ($SiO_2$), and a PET resin modified with isophthalic acid at a ratio of 100:3:5.

The resin for the intermediate layer was composed of a PET resin modified with 1,3-propanediol, a PET resin modified with 1,4-butanediol, and a PET resin modified with naphthalic acid at a ratio of 100:75:10.

The resin for the heat seal layer was composed of a PET resin modified simultaneously with 1,4-cyclohexane dimethanol, 1,3-propanediol, and 1,4-butanediol and a PET resin modified with isophthalic acid at a ratio of 100:30.

Each of the resin for the surface layer, the resin for the intermediate layer, and the resin for the heat seal layer was melted using a twin screw extruder. The temperature of the extruder for the surface layer was controlled to 220-240-270-270-270-270° C., the temperature of the extruder for the intermediate layer was controlled to 200-230-260-260-260-260° C., and the temperature of the extruder for the heat seal layer was controlled to 200-230-255-255-255-255° C. Each molten resin passed through the extruder was coextruded using a T-die at 265° C. and then rapidly cooled to room temperature using a cooling roller. Next, the coextruded resin was preheated to 80° C. and then stretched 3 times in the machine direction (MD) and 4 times in the transverse direction (TD), thereby manufacturing a biaxially stretched PET film.

The biaxially stretched PET film thus manufactured had a total thickness of 36 μm including 8 μm for the surface layer, 20 μm for the intermediate layer, and 8 μm for the heat seal layer.

Comparative Example

A commercially available PET film having a thickness of 36 μm was used.

Property Test

The properties of the PET film manufactured in Example and the PET film according to Comparative Example were tested, and the results thereof are shown in the following table.

| Items | | Unit | Example | Comparative Example | Test method |
|---|---|---|---|---|---|
| Tensile strength | MD | MPa | 187 | 198 | ASTM D 882 |
| | TD | MPa | 205 | 223 | |
| Elongation at break | MD | % | 171 | 148 | |
| | TD | % | 132 | 121 | |

As is apparent from the results shown in the above table, it was found that the PET film manufactured in Example of the present invention exhibited basic properties similar to those of the commercially available PET film according to Comparative Example.

Heat-Seal Lamination Test

Whether the PET film manufactured in Example was capable of being laminated by heat sealing on a metal plate was tested. The heat-seal lamination test was performed under the conditions of a temperature of 230° C., a roller pressure of 3 MPa, and a speed of 25 m/min.

Figure 2:
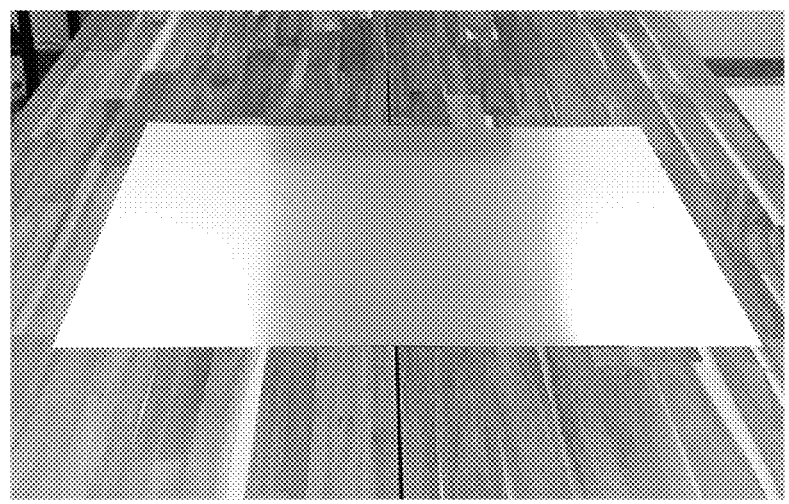
FIG. 2 is a photograph showing the result of heat-seal lamination of the PET film manufactured in Example of the present invention on an aluminum plate.
Figure 3:
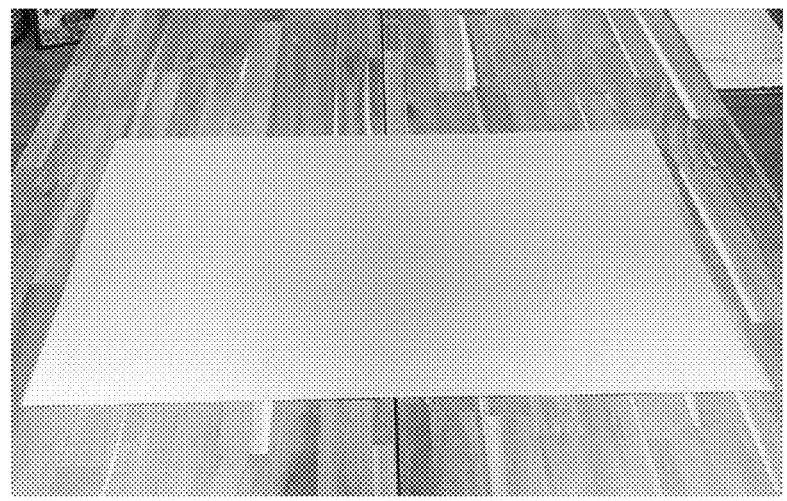
FIG. 3 is a photograph showing the result of heat-seal lamination of the PET film manufactured in Example of the present invention on a tin-coated steel plate.
Figure 4:
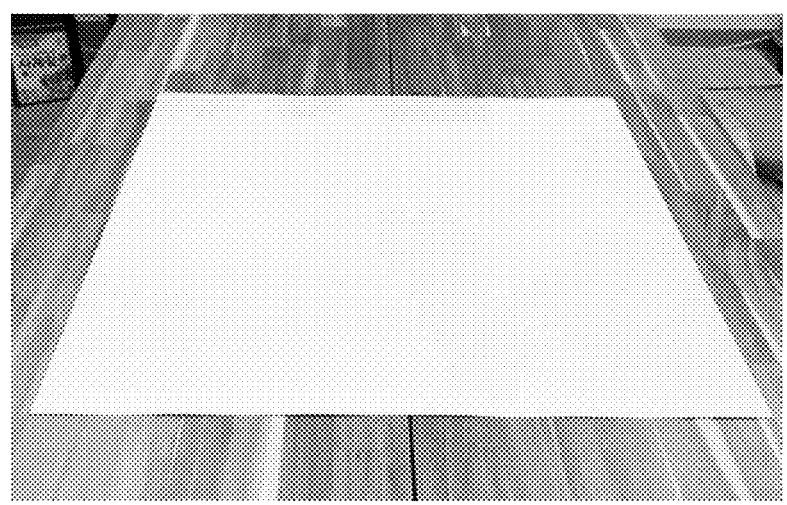
FIG. 4 is a photograph showing the result of heat-seal lamination of the PET film manufactured in Example of the present invention on a chromium-coated steel plate.

FIG. 2 is a photograph showing the result of heat-seal lamination of the PET film manufactured in Example of the present invention on an aluminum plate, FIG. 3 is a photograph showing the result of heat-seal lamination of the PET film manufactured in Example of the present invention on a tin-coated steel plate, and FIG. 4 is a photograph showing the result of heat-seal lamination of the PET film manufactured in Example of the present invention on a chromium-coated steel plate.

As shown in the drawings, it was confirmed that the PET film manufactured in Example of the present invention was firmly laminated by heat sealing on various metal plates.

It can be concluded that the PET film manufactured according to the present invention is easily and firmly bound to various metals simply by applying heat, without the use of an adhesive, as in conventional techniques.

As is apparent from the above description, according to the present invention, it is possible to obtain a PET film that can be easily laminated on the surface of a metal merely by applying heat.

In addition, the heat-seal-laminating PET film according to the present invention is environmentally friendly because it obviates the need to use an adhesive in the process of laminating the PET film on the surface of the metal.

In addition, compared to conventional methods using an adhesive in the process of laminating the PET film on the metal plate, the defect rate can be reduced and productivity can be improved, thus generating economic benefits.

The effects of the present invention are not limited to the foregoing, and other effects not mentioned herein will be clearly understood by those skilled in the art from the description of the present invention.

Although the present invention has been shown and described above in connection with preferred embodiments for illustrating the principle of the present invention, the present invention is not limited to the construction and operation so shown and described, and it will be obvious to those of ordinary skill in the art that many changes and modifications can be made to the present invention without departing from the spirit and scope of the appended claims.

What is claimed is:

1. A heat-seal-laminating PET (polyethylene terephthalate) film capable of being laminated by heat sealing on a metal,
    wherein the PET film is a coextruded PET film comprising an intermediate layer, and a surface layer and a heat seal layer bound to respective sides of the intermediate layer, and
    the heat seal layer comprises 100 parts by weight of a PET resin modified simultaneously with 1,4-cyclohexane dimethanol, 1,3-propanediol, and 1,4-butanediol, and 10 to 50 parts by weight of a PET resin modified with isophthalic acid.

2. The heat-seal-laminating PET film of claim 1, wherein the surface layer comprises 100 parts by weight of a PET resin modified with 1,4-cyclohexane dimethanol, 1 to 5 parts by weight of a PET resin blended with 1 to 20 wt % of inorganic particles selected from the group consisting of silicon dioxide ($SiO_2$), titanium dioxide ($TiO_2$), calcium carbonate ($CaCO_3$), and mixtures thereof, and 2 to 10 parts by weight of a PET resin modified with isophthalic acid.

3. The heat-seal-laminating PET film of claim 1, wherein the intermediate layer comprises 100 parts by weight of a PET resin modified with 1,3-propanediol, 50 to 100 parts by weight of a PET resin modified with 1,4-butanediol, and 5 to 15 parts by weight of a PET resin modified with naphthalic acid.

* * * * *